(12) United States Patent
Lee

(10) Patent No.: US 7,191,748 B2
(45) Date of Patent: Mar. 20, 2007

(54) INTEGRATED AIR AND FUEL CARRIER MODULE

(75) Inventor: Ki-Ho Lee, Windsor (CA)

(73) Assignee: Siemens Canada Limited, Chatham (CA)

( * ) Notice: Subject to any disclaimer, the term of this patent is extended or adjusted under 35 U.S.C. 154(b) by 44 days.

(21) Appl. No.: 10/771,758

(22) Filed: Feb. 4, 2004

(65) Prior Publication Data

US 2004/0159308 A1    Aug. 19, 2004

Related U.S. Application Data

(60) Provisional application No. 60/447,051, filed on Feb. 13, 2003.

(51) Int. Cl.
*F02M 35/10* (2006.01)

(52) U.S. Cl. ............... 123/184.21; 123/336; 123/456; 123/470; 123/585

(58) Field of Classification Search ......... 123/184.21, 123/184.56, 306, 470, 585, 336, 456
See application file for complete search history.

(56) References Cited

U.S. PATENT DOCUMENTS

| | | | | |
|---|---|---|---|---|
| 3,934,851 A | * | 1/1976 | Illing ........................ 251/248 |
| 4,359,024 A | * | 11/1982 | Lootens et al. ........ 123/198 F |
| 4,779,580 A | * | 10/1988 | Rutschmann ........ 123/184.54 |
| 4,907,547 A | | 3/1990 | Daly ..................... 123/52 M |
| 5,101,792 A | | 4/1992 | Koch ....................... 123/456 |
| 5,146,887 A | * | 9/1992 | Gluchowski et al. ..... 123/337 |
| 6,209,501 B1 | | 4/2001 | Kaneko ................ 123/184.21 |
| 6,308,686 B1 | | 10/2001 | Mammarella et al. ..... 123/470 |
| 6,568,366 B2 | * | 5/2003 | Dietz et al. ............... 123/308 |
| 6,575,141 B2 | | 6/2003 | Murphy |
| 2001/0047791 A1 | * | 12/2001 | Oishi ....................... 123/306 |
| 2003/0230285 A1 | * | 12/2003 | Lee et al. ................ 123/470 |

FOREIGN PATENT DOCUMENTS

| | | |
|---|---|---|
| EP | 1150000 | 10/2001 |
| WO | WO 01/36976 | 5/2001 |
| WO | WO 01/48368 | 7/2001 |

OTHER PUBLICATIONS

U.S. Appl. No. 10/436,689, filed May 13, 2003, Lee.

* cited by examiner

*Primary Examiner*—Stephen K. Cronin
*Assistant Examiner*—Katrina B. Harris

(57) ABSTRACT

An air induction manifold has manifold air passages. A carrier has air passages to communicate air from the manifold air passages to an engine. The carrier has a first sealing interface for a manifold and a second sealing interface for an engine cylinder. The first sealing interface seals the communication of air between the manifold air passage and the carrier air passage. A valve is mounted to the carrier that controls the communication of air through the carrier air passage.

18 Claims, 3 Drawing Sheets

INTEGRATED AIR AND FUEL CARRIER MODULE

This application claims priority to U.S. Provisional Patent Application Ser. No. 60/447,051 filed on Feb. 13, 2003.

BACKGROUND OF THE INVENTION

This invention relates to an air intake manifold assembly for a vehicle engine.

An air intake manifold provides air to a vehicle engine. Typically, air is received by an air intake and passed to the air intake manifold where the manifold divides the air through passages into separate streams for each cylinder of the engine. The air intake manifold is mounted to the engine so that each of the separate passages of the manifold provides air to each of the separate combustion chambers of the engine. Fuel injectors are located over each cylinder of the engine as well and serve to distribute fuel for mixture with the incoming air from the manifold. This mixture is then combusted in the cylinder.

Manufacturers have used valves within the manifold to control the flow of air through each passage. These valves are commonly known as tumble or swirl valves. As known, these valves may be opened and closed to adjust the level of air turbulence within the passage of the manifold. In so doing, these valves may improve the performance of the engine, improve its efficiency and reduce vehicle emissions.

Due to the location of these valves within the passages of the manifold, these valves may be difficult to adjust and/or service. In addition, their location within the manifold increases the complexity of the manifold as well as the number of its parts. As a consequence, the manifold is costly to produce.

A need therefore exists for a simplified air intake manifold assembly that has tumble valves.

SUMMARY OF THE INVENTION

The invention comprises an air induction manifold assembly. Like existing manifolds, the inventive manifold supplies air to the combustion chambers of an engine through separate air passages. However, rather than locate the tumble valve in the manifold air passage, the valve is mounted on a support distinct from the manifold, known as a carrier. The carrier is then sandwiched between the manifold and the vehicle engine. In this way, assembly is greatly simplified and the number of parts reduced.

The carrier has carrier air passage for each manifold air passage. The valve is mounted to the carrier and controls passage of air from the manifold air passage through the carrier air passage to the engine. The carrier has a first sealing surface and, on the other side, a second sealing surface. The first sealing surface seals the interface between the manifold and carrier while the second sealing surface seals the interface between the carrier and the engine.

The valve may be a flap, which is pivotably mounted to the carrier by a shaft. The shaft may be mounted on one end of a flap or through the middle of the flap. The shaft is further mounted to the carrier by a bearing surface, which permits the shaft to rotate freely relative to the carrier. The bearing surface may be a ball bearing, sleeve or other known bearing surfaces.

The carrier may also combine other features of the air induction system. The carrier may mount an actuator for controlling the valves. Also, seals may be placed on the surfaces of the carrier. Moreover, the carrier may have supports for fuel injectors of the fuel system of the vehicle to permit their installation with the tumble valves on the engine. Wire may be embedded in the carrier to power the fuel injectors. By combining these elements in this fashion, the time for assembly of both the air intake manifold and fuel packages is greatly reduced. The number of parts is also reduced.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
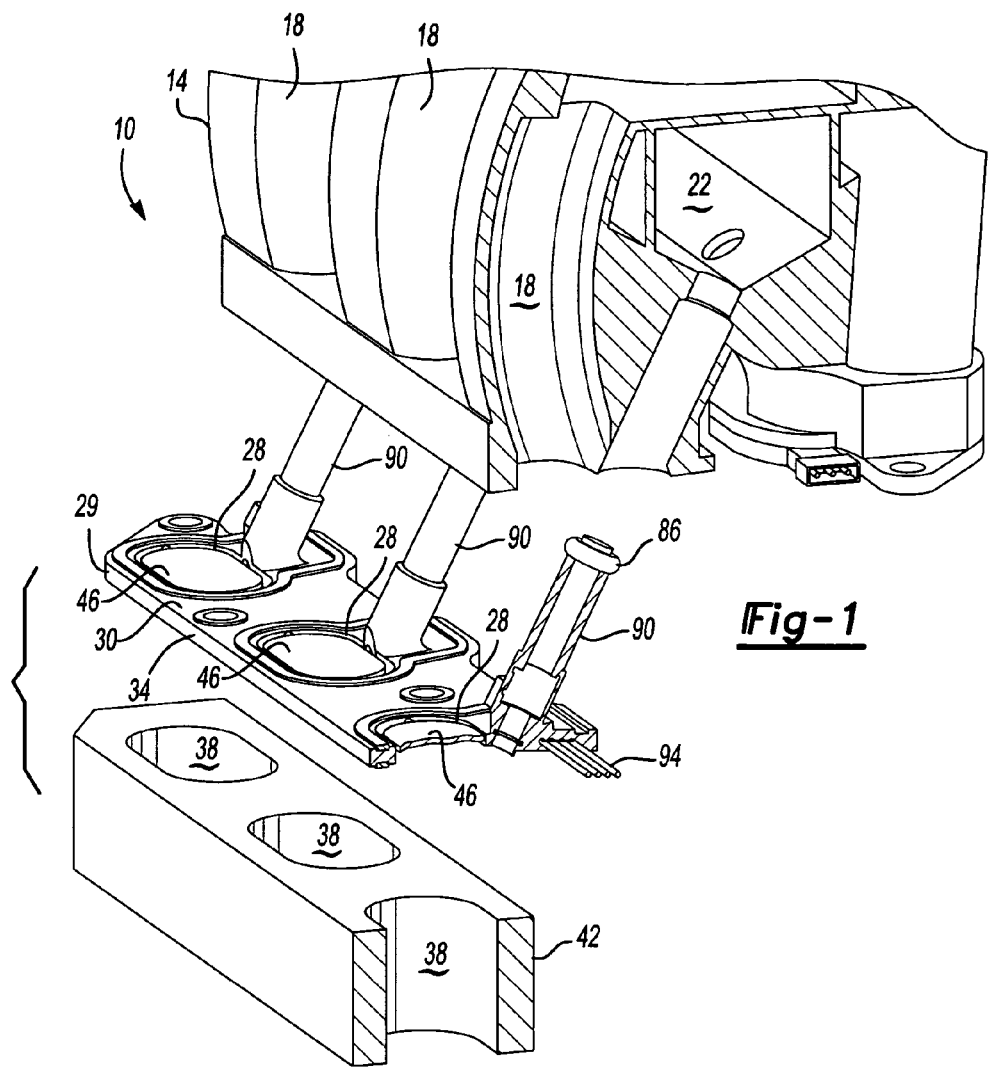
FIG. 1 illustrates a perspective exploded view of the inventive air intake manifold assembly, showing carrier with valves.

FIG. 1 illustrates a perspective view of air induction manifold assembly 10. Manifold 14 provides air to engine cylinders 38 of engine head 42. Manifold 14 is formed with manifold air passages 18, one for each engine cylinder 38. In addition, manifold 14 has fuel rail 22 formed as part of the manifold to supply fuel to fuel injectors 86, which provide fuel for mixture with air from manifold air passages 18. This mixture is then combusted in engine cylinders 38.

In contrast to other designs, air induction manifold assembly 10 has valves 46, here tumble or swirl valves, pivotally mounted to carrier 26. Valves 46 control the flow of air between manifold air passages 18 and engine cylinder 38 like known swirl or tumble valves. However, unlike conventional valves, valves 46 are not mounted within manifold air passages 18 of manifold 14. In this way, construction of manifold 14 is greatly simplified and the number of its parts also reduced.

Carrier 26 comprises a planar member 29 having carrier air openings 28, one opening for each manifold air passage 18 and engine cylinder 38. Planar member 29 has first sealing interface 30 and second sealing interface 34. First sealing interface 30 receives manifold 14 while second sealing interface 34 receives engine block 42. Carrier 26 is sandwiched between manifold 14 and engine block 42. Carrier 26 has seals 82 on both first sealing interface 30 and second sealing interface 34 to seal the interface between manifold 14 and carrier 26 and to seal the interface between carrier 26 and engine head 42. Seals may be O-ring, lip seal or other commercially available seal.

Figure 5:
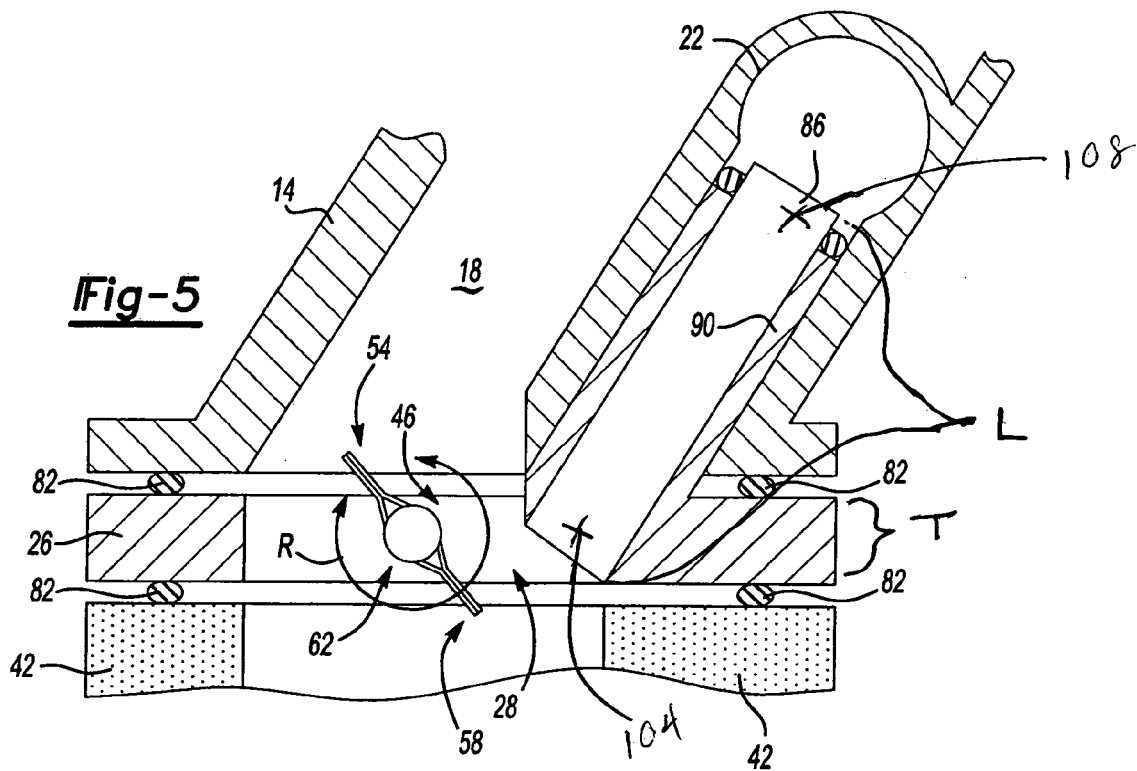
FIG. 5 illustrates an alternative version of the invention, showing a valve supported through its middle portion.

In addition, carrier 26, having thickness T, is also formed with fuel injector supports 90 as taught by U.S. Nonprovisional Patent Application Ser. No. 10/436,689 filed on May 13, 2003, which is hereby incorporated by reference. Fuel injectors 86, having length L, may be inserted into fuel injector supports 90. As shown in FIG. 5, thickness T is less than length L. Moreover, wiring 94 used power fuel injectors 86 may be embedded in carrier 26. Actuator 78 serves to control opening and closing of valves 46 along arrow R. Actuator 78 is preferably mounted to carrier 26 and may be an electric motor or vacuum drive actuator. In this way, a number of differing components may be supported on a single carrier to be installed between manifold 14 and engine block 42. As further shown in FIG. 5, fuel injector 86 has discharge end portion 104 for discharging fuel from fuel rail 22 spaced from fuel receiving end portion 108, which receives fuel from fuel rail 22.

Figure 2:
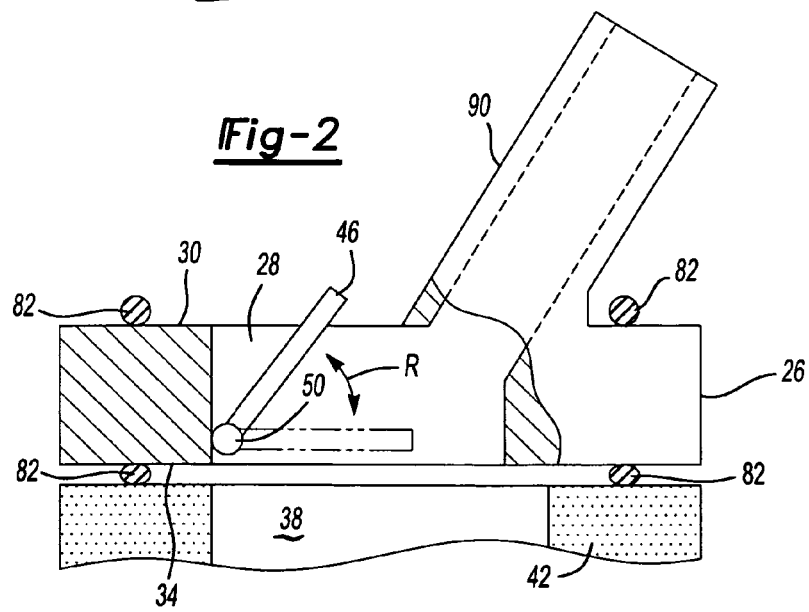
FIG. 2 illustrates a cross-sectional view of the inventive carrier of FIG. 1, highlighting the location of a valve.

As shown in FIG. 2, valve 46 is pivotally mounted to carrier 26 to permit its movement along the direction of arrow R. As shown, valve 46 comprises a flap sized to partially cover but not fully cover carrier air opening 28 when completely closed. It is important that valve 46 not completely close so that some air may continue to support ignition within engine cylinder 38. In one example, seventy to eighty percent of carrier air opening 28 remains open when valve 46 is fully closed.

Figure 3:
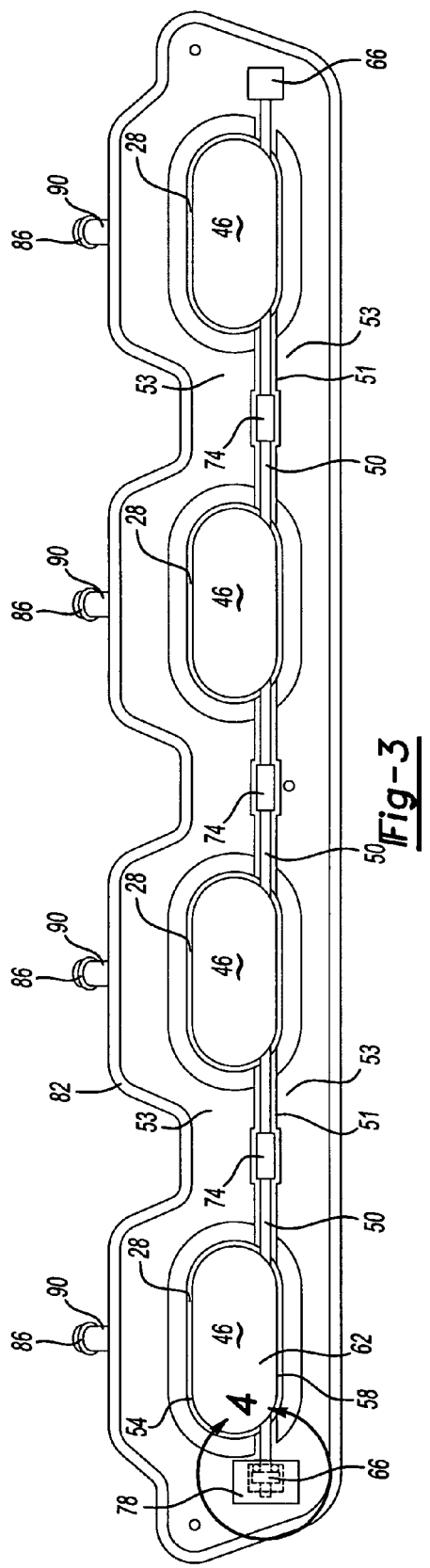
FIG. 3 illustrates a bottom view of the carrier of FIGS. 1 and 2, showing the mounting of the valves to the carrier.

FIG. 3 illustrates a bottom view of carrier 26. As shown, valves 46 are mounted to carrier 26 at bearing surface 66 through shaft 50. Bearing surface 66 may be a ball bearing, needle bearing, sliding bearing or other commercially available bearing. Shaft 50 is disposed in channel 51 to limit communication of air between openings 28. Lands 53 are raised above channel 51 to seal one opening 28 from another opening 28. Shaft 50 may be plastic or metal. To prevent damage to carrier 26 by shaft 50, metal sleeves 74 provide another bearing surface upon which shaft 50 may turn. In addition, sleeves 74 serve as a seal between openings 28. In one example, sleeves 74 are metal and need not be mounted to carrier 26.

Figure 4:
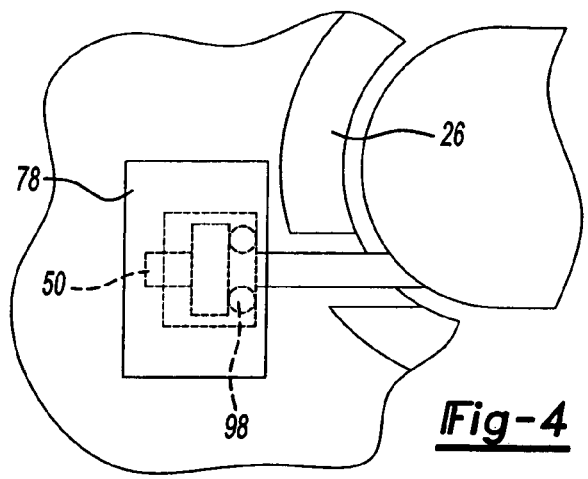
FIG. 4 illustrates a cross sectional view of the mounting of a shaft supporting the valves to the carrier.

As shown in FIG. 4, at the end of carrier 26 that supports actuator 78, shaft 50 may be supported by a ball bearing 70. Shaft 50 extends through ball bearing 70 for connecting to actuator 78. In this example, the bearing seal 98 is employed to prevent the leakage of air from manifold 14 out of this end of carrier 26.

As seen in FIG. 3, valve 46 has first end portion 54, second end portion 58 and middle portion 62 spaced between first end portion 54 and second end portion 58. Shaft 50 is mounted to second end portion 58 of valves 46. Valve 46 may be mounted to shaft 50 in other ways as well.

Figure 6:
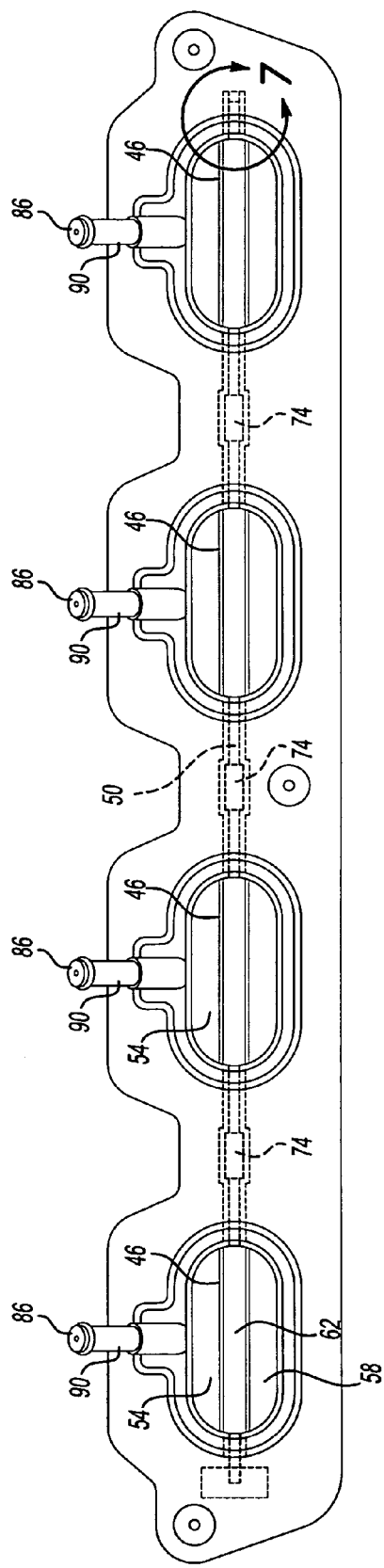
FIG. 6 illustrates a top view of the version of the invention of FIG. 5.

Alternatively, FIG. 5 shows the mounting of valve 46 through middle portion 62 of valve 46. Mounting valve 46 through middle portion 62 allows for less torque to control the positioning of valve 46 in contrast to mounting shaft 50 to an end portion as shown in FIG. 3. Mounting shaft 50 through middle partition 62 is likely to be more durable too. However, mounting shaft 50 to middle portion 62 requires more space and will restrict air flow in the open position. FIG. 6 illustrates a bottom view of carrier 26 mounting valve 46 through middle portion 62.

Figure 7:
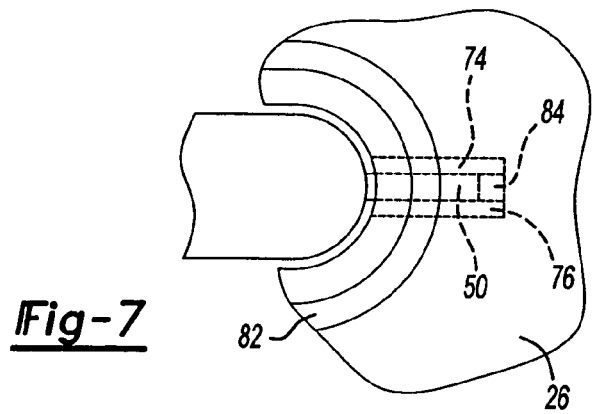
FIG. 7 illustrates a cross-sectional view of the mounting of a shaft supporting the valves of the carrier.

FIG. 7 illustrates another way to mount shaft 50 to carrier 26. As shown, FIG. 7 mounts shaft 50 into metal sleeve 74, which itself is mounted into hole 76 of carrier 26. Here, no seal is required because hole 76 has bottom 84 and is not open generally to atmosphere.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air induction body assembly for a vehicle, comprising
    a carrier having a first sealing interface for a manifold and a second sealing interface for an engine cylinder, wherein said carrier defines an air entry side and an air discharge side;
    at least one air opening extending through said carrier, said at least one air opening for communicating air to the engine cylinder;
    at least one valve mounted to said carrier and moveable to a position wherein the at least one valve extends through at least one of said air entry side or said air discharge side to control the communication of air through said at least one opening; and
    at least one seal disposed on one of said first sealing interface and said second sealing interface.

2. The air induction body assembly of claim 1 wherein said valve comprises a flap, said flap pivotally mounted to said carrier by a shaft.

3. The air induction body assembly of claim 2 wherein said shaft is mounted on said carrier by a bearing surface.

4. The air induction body assembly of claim 3 wherein said bearing surface comprises a ball bearing.

5. The air induction body assembly of claim 3 wherein said bearing surface comprises a sleeve.

6. The air induction body assembly of claim 2, wherein said carrier comprises a carrier length and a carrier thickness that extends between said first sealing interface for said manifold and said second sealing interface for said engine cylinder, said carrier thickness is shorter than said carrier length, said flap includes a flap length and a flap thickness that is shorter than said flap length, and said flap length is greater than said carrier thickness.

7. The air induction body assembly of claim 1 including an actuator for controlling said at least one valve, said actuator mounted directly on said carrier.

8. The air induction body assembly of claim 1 wherein said at least one air opening comprises a plurality of air openings and said at least one valve comprises a plurality of valves for controlling air through said plurality of air openings, and including a shaft interconnecting said plurality of valves.

9. The air induction body assembly of claim 1 wherein said carrier has a support for a fuel injector.

10. The air induction body assembly of claim 9 including a fuel injector supported by said support.

11. The air induction body assembly of claim 9 including at least one wire embedded in said carrier to power said fuel injector.

12. The air induction manifold assembly of claim 1, wherein said at least one seal includes a first seal for said first sealing interface and a second seal for said second sealing interface.

13. The air induction body assembly of claim 1, wherein said carrier includes a planar member that defines said at least one air opening and receives said at least one valve.

14. The air induction body assembly of claim 13, wherein said planar member pivotally receives said at least one valve.

15. An air induction body assembly for a vehicle, comprising:

a carrier having a first sealing interface for a manifold and a second sealing interface for an engine cylinder;
at least one air opening extending through said carrier, said at least one air opening for communicating air to the engine cylinder;
at least one valve mounted to said carrier, said at least one valve for controlling the communication of air through said at least one air opening;
said carrier having a support for a fuel injector;
a fuel injector supported by said support;
said fuel injector having a discharge end portion for discharging fuel spaced from a receiving end portion for receiving fuel, said at least one valve located closer to said discharge end portion for discharging fuel than to said receiving end portion for receiving fuel; and
an actuator for controlling said at least one valve, said actuator mounted to said carrier.

16. The air induction manifold assembly of claim 15 wherein said valve comprises a flap.

17. The air induction manifold assembly of claim 16 wherein said flap is pivotally mounted to said carrier by a shaft.

18. An air induction body assembly for a vehicle, comprising:
a carrier having a first sealing interface for a manifold and a second sealing interface for an engine cylinder, wherein said carrier defines an air entry side and an air discharge side;
at least one air opening extending through said carrier, said at least one air opening for communicating air to the engine cylinder;
at least one valve comprising a flap pivotally mounted to said carrier by a shaft and moveable to a position wherein the flap extends through both said air entry side and said air discharge side to control the communication of air through said at least one opening; and
at least one wire embedded in said carrier for powering a fuel injector.

* * * * *